(12) United States Patent
Uehara

(10) Patent No.: US 7,068,435 B2
(45) Date of Patent: Jun. 27, 2006

(54) OPTICAL SYSTEM RADIAL DEFORMATION ADJUSTMENT METHOD AND SYSTEM

(75) Inventor: Takeshi Uehara, Suwa (JP)

(73) Assignee: Olympus Corporation, Tokyo (JP)

( * ) Notice: Subject to any disclaimer, the term of this patent is extended or adjusted under 35 U.S.C. 154(b) by 125 days.

(21) Appl. No.: 10/900,606

(22) Filed: Jul. 27, 2004

(65) Prior Publication Data

US 2005/0024735 A1 Feb. 3, 2005

(30) Foreign Application Priority Data

Jul. 31, 2003 (JP) ............................. 2003-283459

(51) Int. Cl.
*G02B 3/00* (2006.01)
(52) U.S. Cl. .................................... 359/642
(58) Field of Classification Search ................ 359/642, 359/708

See application file for complete search history.

(56) References Cited

U.S. PATENT DOCUMENTS 6,059,635 A 5/2000 Mizuno 6,377,333 B1 4/2002 Chiba et al.
2002/0003965 A1* 1/2002 Landelle et al. ............. 396/661

FOREIGN PATENT DOCUMENTS

| EP | 0 660 169 A1 | 6/1995 |
|---|---|---|
| JP | 8-203805 A | 8/1996 |
| JP | 11-31652 A | 2/1999 |
| JP | 2000-286178 A | 10/2000 |

* cited by examiner

*Primary Examiner*—Scott J. Sugarman
(74) *Attorney, Agent, or Firm*—Frishauf, Holtz, Goodman & Chick, P.C.

(57) ABSTRACT

A optical system radial deformation adjustment method includes predicting radial deformation generated when an optical system comprising at least an optical element is assembled, calculating a surface shape and a change quantity of the optical element that are used to correct the predicted radial deformation, applying correction processing to the surface of the optical element based on the calculated surface shape and change quantity of the optical element, and assembling and adjusting the optical system by using the optical element to which the correction processing is applied as the optical element from which the radial deformation is predicted.

42 Claims, 8 Drawing Sheets

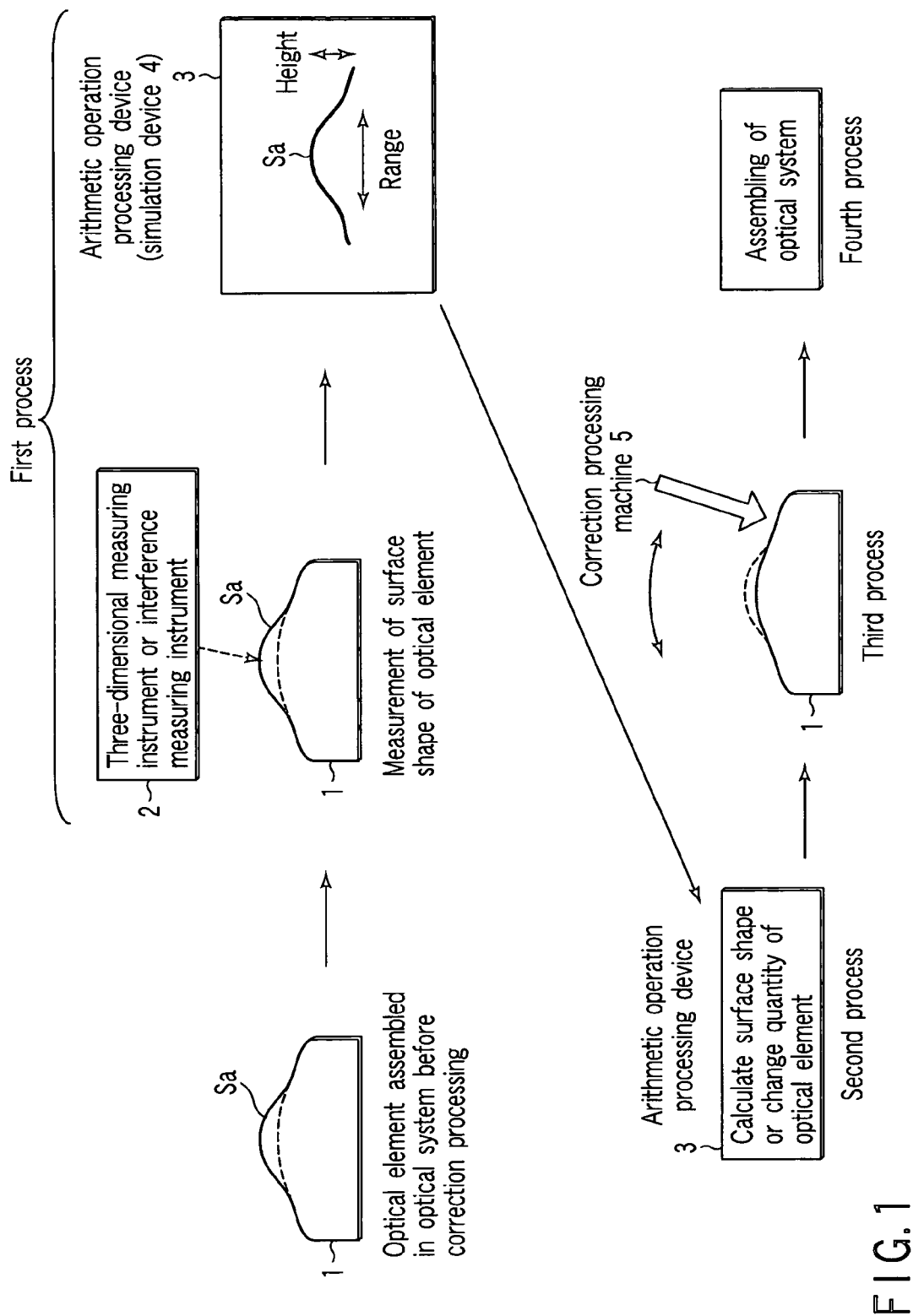
F I G. 1

Data management of A3-B2 class
N=10                                Coefficient data of polynomial

N=1

$C_1 = \cdots\cdots$
$\vdots \quad \vdots$
$C_9 = 0.021$
$\vdots \quad \vdots$
$C_{16} = 0.005$ $C_1 = \cdots\cdots$
$\vdots \quad \vdots$
$C_9 = 0.039$
$\vdots \quad \vdots$
$C_{16} = 0.001$ $\cdots\cdots$

N=10

$C_1 = \cdots\cdots$
$\vdots \quad \vdots$
$C_9 = 0.043$
$\vdots \quad \vdots$
$C_{16} = 0.007$ $W'(0,0)=0.014$
$W'(1,0)=0.012$
$\vdots$ N : Quantity (number) of selection target optical elements
$C_j$ : Coefficient approximated to polynomial
$W'(x,y) : \Sigma w_k(x_k, y_k) \cdot n_k$
n : Refractive index of replacement target optical element

FIG. 12

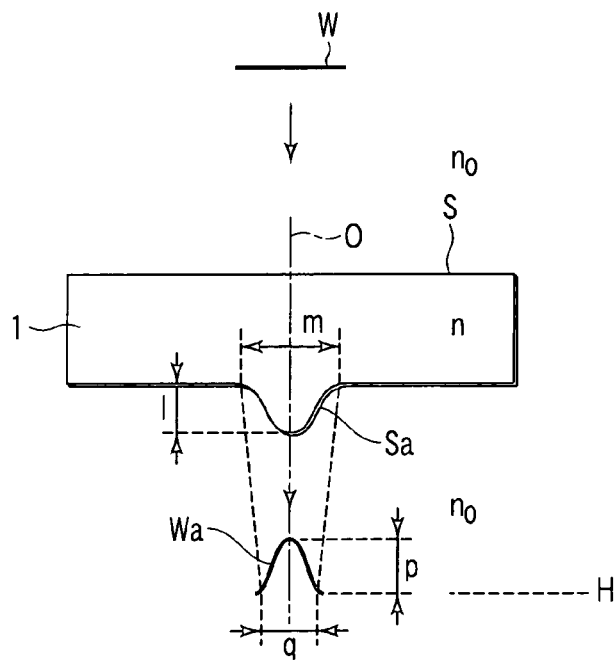

FIG. 13

OPTICAL SYSTEM RADIAL DEFORMATION ADJUSTMENT METHOD AND SYSTEM

CROSS-REFERENCE TO RELATED APPLICATIONS

This application is based upon and claims the benefit of priority from prior Japanese Patent Application No. 2003-283459, filed Jul. 31, 2003, the entire contents of which are incorporated herein by reference.

BACKGROUND OF THE INVENTION

1. Field of the Invention

The present invention relates to an optical system radial deformation adjustment method and system, which corrects radial deformation that is produced in an optical system comprising at least an optical element such as an optical lens.

2. Description of the Related Art

There is an optical system that is constituted by combining at least an optical element such as an optical lens and requires high optical performances. Such an optical system minimizes deteriorations in optical performances due to manufacturing errors of the optical element and degradations in optical performances generated when manufacturing the optical element by assembling.

As an adjustment method for minimizing deteriorations in the optical performances, there are, e.g., a method for adjusting an air gap between respective optical elements by, e.g., changing a thickness of a washer between body tubes holding optical elements, a method for shifting the optical element in a vertical direction with respect to an optical axis, a method for tiling the optical element with a direction vertical to an optical axis being determined as an axis, a method for rotating the optical element around an optical axis and others as disclosed in Jpn. Pat. Appln. KOKAI Publication No. 8-203805.

However, in the above-described adjustment methods, there remains radial deformation, which cannot be eliminated among factors that deteriorate the optical performances. This radial deformation is a phenomenon that, when light (spherical wave) from a finitely far object point existing on an optical axis of an optical system or light (plane wave) parallel to the optical axis of the optical system from infinity is transmitted through the optical system, a difference from an aplanatic ideal wavefront has a convex shape or a concave shape that can be regarded as being rotational symmetric with the optical axis of the optical system at the center on a wavefront (transmitted wavefront) of transmitted light projected from the optical system.

FIG. 13 is a view illustrating radial deformation generated in an optical element 1, and shows a model of an optical system comprising an optical element 1, which is a simple plane-parallel plate. The optical element 1, which is before radial deformation adjustment, has radial deformation. Light having a plane wave W enters a surface S of the optical element 1 in a vertical direction from an area having an even refractive index $n_0$. The refractive index in the optical element 1 is even n. Here, the refractive index no of the area and the refractive index n in the optical element 1 have a relationship of $n_0<n$. The light having the plane wave W that has entered the surface S of the optical element 1 in the vertical direction goes straight without being affected by refraction based on the respective refractive indices $n_0<n$ and without generating a change in the wavefront while maintaining the plane wave W.

The light having the plane wave W, after transmitted through the optical element 1, reaches the other surface Sa. Here, if a shape of the surface Sa is formed into, e.g., a convex shape that is rotational symmetric with respect to an optical axis O and pendent toward a lower side, a distance of the light moving in the optical element 1 with the refractive index n becomes long as it is close to the optical axis O and it becomes short as it is far from the optical axis O at a part having this convex shape. As a result, an optical path length of the light emitted from the other surface Sa becomes long as the light is close to the optical axis O, and advance of a wavefront Wa projected from the optical element 1 is delayed because of expansion of the optical path length. Further, the light projected from the optical element 1 is affected by refraction and become convergent light. The outgoing wavefront Wa has an upward convex shape that is rotational symmetric with respect to the optical axis O at a wavefront evaluation position H.

When the light having the plane wave W is caused to enter the optical element 1 constituted of the plane-parallel plate, an ideal wavefront of the light projected from the optical element 1 is a plane wave. The wavefront Wa with the upward convex shape that is rotational symmetric with respect to the optical axis O in the vicinity of the optical axis O in a difference between the plane wave W as the ideal wavefront and the transmitted wavefront Wa is radial deformation.

A height P of the radial deformation at the position of the optical axis O becomes n×l, which is a product of the refractive index n in the optical element 1 and a height I of the convex shape of the surface Sa at the position of the optical axis O. Since the light beam projected from the surface Sa is a convergent light beam, assuming that m is a diameter of the convex shape on the surface Sa, a diameter q of a range of the radial deformation has a relationship of $q<m$.

Furthermore, if the relationship of the refractive indices is $n_0>n$ or if a shape of the surface Sa is an upward convex shape that is rotational symmetric with respect to the optical axis O (recessed shape), the wavefront Wa having the convex shape in a direction opposite to the radial deformation shown in FIG. 13 becomes the radial deformation.

A main factor of such radial deformation is a surface shape including a manufacturing error of the optical element such as an optical lens constituting the optical system. The optical element such as an optical lens is manufactured by polishing a curved surface with a given curvature radius or a plane surface by using a glass material. When a portion in the vicinity of the optical axis or in the vicinity of an outer periphery is excessively or insufficiently polished in this polishing process, it is often the case that this portion is polished into a surface shape which is a convex or concave shape rotational symmetric with respect to the optical axis in a range narrower than an effective diameter (diameter of the range through which the light is transmitted) of the surface.

When the optical element having a convex or concave surface shape rotational symmetric with respect to the optical axis in the range narrower than the effective diameter (diameter of the range through which the light is transmitted) of the surface is assembled into the optical system, radial deformation occurs, and optical performances of the optical system are deteriorated. It is often the case that the radial deformation occurs to be rotational symmetric in the vicinity of the optical axis or in the vicinity of the outer periphery under the influence of the surface shape in the range narrower than the effective diameter of the surface.

BRIEF SUMMARY OF THE INVENTION

According to an aspect, the present invention is intended for an optical system radial deformation adjustment method.

The radial deformation adjustment method according to the present invention comprises predicting radial deformation generated when an optical system comprising at least an optical element is assembled, calculating a surface shape and a change quantity of the optical element that are used to correct the predicted radial deformation, applying correction processing to the surface of the optical element based on the calculated surface shape and change quantity of the optical element, and assembling and adjusting the optical system by using the optical element to which the correction processing is applied as the optical element from which the radial deformation is predicted.

Another radial deformation adjustment method according to the present invention comprises measuring radial deformation generated in an optical system comprising at least an optical element after assembling and adjusting the optical system, measuring a shape of a correction processing target surface on which the radial deformation of the optical system is generated, and calculating a shape and a change quantity of the correction processing target surface that are used to correct the radial deformation, correcting the radial deformation by applying correction processing to the correction processing target surface of the optical element based on the shape and change quantity of the correction processing target surface, and assembling and adjusting the optical system including the optical element to which the correction processing is applied and the optical element from which the radial deformation is measured.

Still another adjustment method according to the present invention comprises measuring radial deformation generated in an optical system comprising at least an optical element, measuring surface shapes of exchangeable replacement target optical elements among the optical elements in the optical system, and calculating surface shapes and their change quantities of the replacement target optical elements that enable correction of the radial deformation, selecting the replacement target optical element that enables correction of the radial deformation from the replacement target optical elements, and assembling and adjusting the optical system by using the selected replacement target optical element.

Yet another adjustment method according to the present invention comprises measuring radial deformation generated in an optical system comprising at least an optical element, measuring surface shapes of exchangeable replacement target optical elements among the optical elements in the optical system, and calculating surface shapes and their change quantities of the replacement target optical elements that enable correction of the radial deformation, selecting the replacement target optical element that enables correction of the radial deformation from the replacement target optical elements, applying correction processing to a surface shape of the selected replacement target optical element based on the calculated surface shape and change quantity of the replacement target optical element, and assembling and adjusting the optical system by using the replacement target optical element to which the correction processing is applied.

According to another aspect, the present invention is intended for an optical system radial deformation adjustment system.

A radial deformation adjustment system according to the present invention comprises a prediction device that predicts radial deformation generated when an optical system comprising at least an optical element is assembled, an arithmetic operation device that calculates a surface shape and a change quantity of the optical element that are used to correct the radial deformation predicted by the prediction device, and a correction processing machine that applies correction processing to the surface of the optical element based on the surface shape and change quantity of the optical element calculated by the arithmetic operation device, wherein the optical system is assembled and adjusted by using the optical element to which the correction processing is applied by the correction processing machine as the optical element from which the radial deformation is predicted by the prediction device.

Another radial deformation adjustment system according to the present invention comprises a measurement device that measures radial deformation generated in an optical system comprising at least an optical element after assembling and adjusting the optical system, an arithmetic operation device that measures a shape of a correction processing target surface of the optical element that affects generation of the radial deformation in the optical system, and calculates a shape and a change quantity of the correction processing target surface that are used to correct the radial deformation, and a correction processing machine that corrects the radial deformation by applying correction processing to the correction processing target surface of the optical element based on the shape and change quantity of the correction processing target surface, wherein the optical system including the optical element to which the correction processing is applied and including the optical element from which the radial deformation is measured are assembled and adjusted.

Still another radial deformation adjustment system according to the present invention comprises a measurement device that measures radial deformation generated in an optical system comprising at least an optical element, an arithmetic operation device that measures surface shapes of exchangeable replacement target optical elements among the optical elements in the optical system, and calculates surface shapes and their change quantities of the replacement target optical element that enable correction of the radial deformation, and a selector that selects the replacement target optical element that enables correction of the radial deformation from the replacement target optical elements, wherein the optical system is assembled and adjusted by using the replacement target optical element selected by the selector.

Yet another radial deformation adjustment system according to the present invention comprises a measurement device that measures radial deformation generated in an optical system comprising at least an optical element, an arithmetic operation device that measures surface shapes of exchangeable replacement target optical elements among the optical elements in the optical system, and calculates surface shapes and their change quantities of the replacement target optical elements that enable correction of the radial deformation, a selector that selects the replacement target optical element that enables correction of the radial deformation from the replacement target optical elements, and a correction processing machine that applies correction processing to the surface shape of the replacement target optical element selected by the selector based on the surface shape and change quantity of the replacement target optical element calculated by the arithmetic operation device, wherein the optical system is assembled and adjusted by using the replacement target optical element to which the correction processing is applied.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a process chart showing a first embodiment of an optical system radial deformation adjustment method according to the present invention;

FIG. 12 is a view showing data management of each class in the matrix in the radial deformation adjustment method; and FIG. 13 is a view illustrating radial deformation generated in the optical element.

DETAILED DESCRIPTION OF THE INVENTION

A first embodiment according to the present invention will now be described with reference to the accompanying drawings.

Figure 2:
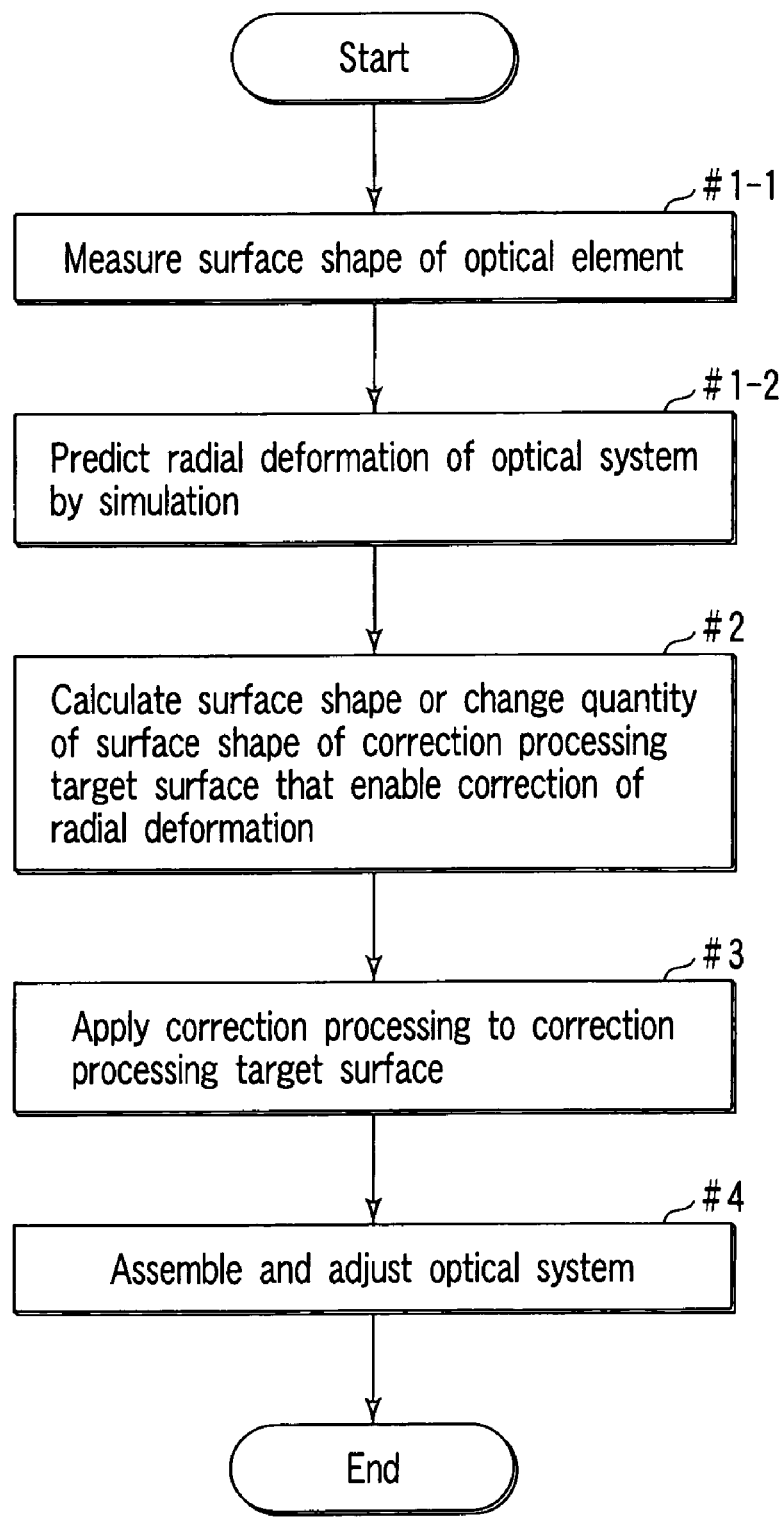
FIG. 2 is a flowchart showing the optical system radial deformation adjustment method in the radial deformation adjustment method.

FIG. 1 is a process chart showing an optical system radial deformation adjustment method, and FIG. 2 is a flowchart of the radial deformation adjustment method. In an assembly line of an optical system, an optical system including at least an optical element 1 such as an optical lens is assembled. This optical element 1, which is before radial deformation adjustment, has a surface Sa with a convex shape.

A first process will now be described. In the first process #1-1, a shape of at least a surface of at least an optical element 1 is measured. This measurement of the surface shape uses a three-dimensional measuring instrument, an interference measuring instrument 2 or the like. In this measurement of the surface shape, all surfaces of all optical elements that affect generation of radial deformation to no small extent may be determined as measurement target surfaces, or at least a surface that greatly affects generation of radial deformation may be selected as measurement target surfaces. It can be considered that a shape of the surface that greatly affects generation of radial deformation in the vicinity of an optical axis is statistically apt to have a convex shape or a concave shape due to polishing processing as compared with an ideal surface.

Then, in the first process #1-2, the radial deformation generated when the optical system is actually assembled is predicted by simulation processing of a simulation device 4 in an arithmetic operation processing device 3 based on a result of the surface shape measurement of the optical element 1. In this simulation processing, for example, the shape of the measurement target surface of the optical element 1 is substituted with the surface shape obtained based on the measurement result, and an optical path length of light to a radial deformation evaluation surface, e.g., an optical path length of the light that enters from one surface S and is projected from the other surface (radial deformation evaluation surface) Sa of the optical element 1 shown in FIG. 13 is calculated by real ray tracing.

The real ray tracing is a method for accurately calculating rules of refraction and reflection, to obtain a position, a direction and others of light rays. The real ray tracing enables tracing of light rays taking an eccentricity quantity and an aspheric surface of the optical system into consideration, and is extensively utilized in design, evaluation and others of the optical system using a computing machine.

In the real ray tracing, the following processing is carried out. An intersection point $P_k$ with a surface k of the optical element 1 is obtained from a position vector $P_0$ and a direction vector $R_0$ of a light ray 10 that enters the optical element 1 is obtained, and an incident angle $\theta_{ik}$ of the light ray 10 is determined from a normal line vector $H_k$ of the surface k at the intersection position $P_k$.

Moreover, an outgoing angle $\theta_{ok}$ on the surface k and a direction vector $P_k$ of an outgoing light ray are determined based on a refractive index $n_0$ on the incident side and a refractive index $n_k$ on the outgoing side by using the following Snell's law.

$$n_0 \cdot \sin \theta_{ik} = n_k \cdot \sin \theta_{ok} \quad (1)$$

Thereafter, it is determined that $P_k$ is a position vector at the intersection point $P_k$ on the surface k and a direction vector $R_k$ of the outgoing light ray is an incident light ray 11 to the surface k+1, and an intersection point $P_{k+1}$ with the surface k+1 and a direction vector $R_{k+1}$ of the outgoing light ray are repeatedly obtained.

Figure 4:
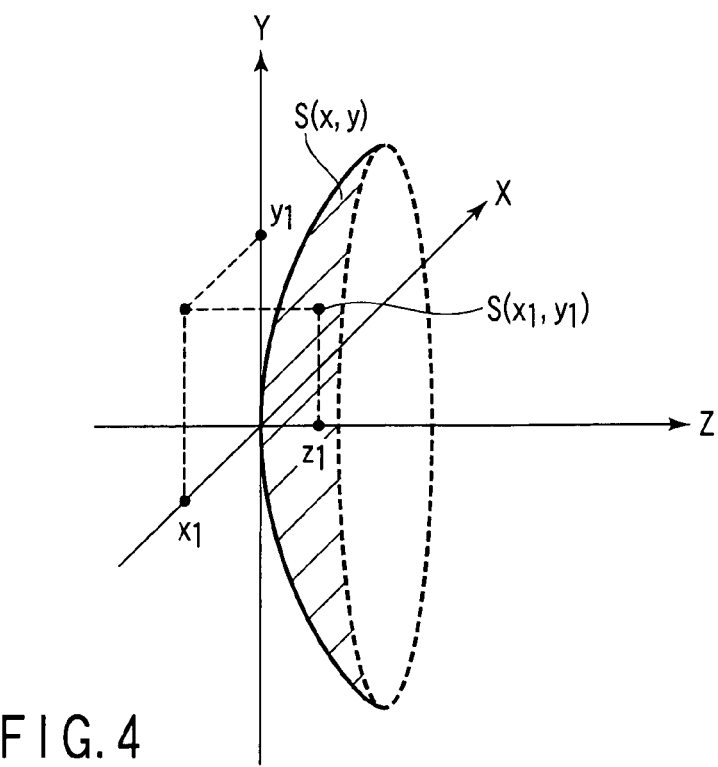
FIG. 4 is a type drawing illustrating the real ray tracing processing in the radial deformation adjustment method.

The shape of the measurement target surface of the optical element 1 is represented by using a function Z=S(X, Y) based on a measurement result obtained by a three-dimensional measuring instrument, an interference measuring instrument 2 or the like as shown in FIG. 4. As a result, it is possible to improve each processing efficiency of the calculation of the respective intersection points $P_k$ and $P_{k+1}$ between the respective light rays 10 and 11 and the surfaces k and k+1 and the calculation of the normal line vector $H_k$ on the surface k at the intersection point $P_k$ in the real ray tracing.

Figure 3:
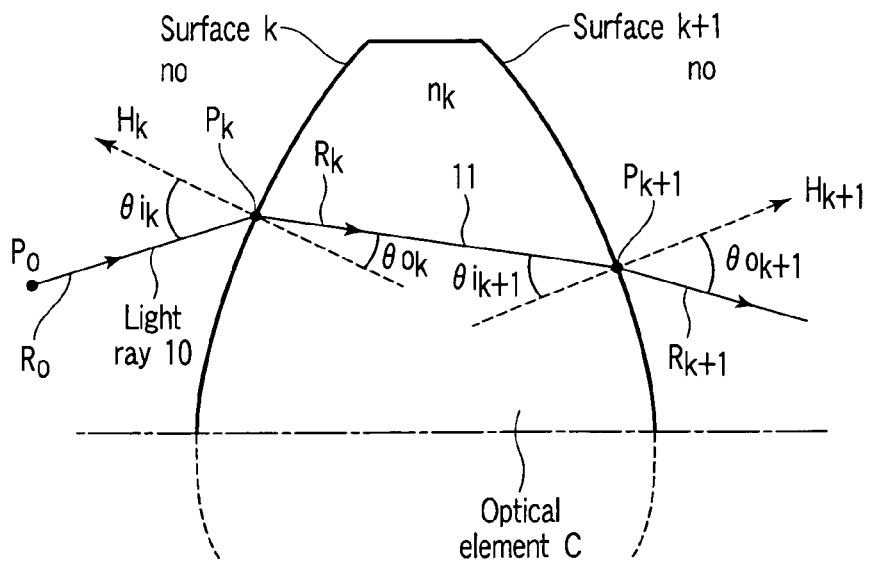
FIG. 3 is a type drawing illustrating real ray tracing processing in the radial deformation adjustment method.

In the real ray tracing processing, it is possible to calculate how the light ray 10 that have entered the optical system are transmitted through and projected from the optical system. An optical path length of the light ray 10 can be calculated based on a sum of values obtained by multiplying lengths t of the respective intersection points $P_k$ and $P_{k+1}$ between the light ray 10 and the surfaces k and k+1 by a refractive index n ($n_k$ in FIG. 3) from the light source to the radial deformation evaluation surface. By obtaining a difference from the optical path length of other light rays with reference to an optical path length of light ray (principal ray) that matches with the optical axis of the optical system among the optical path lengths of the light rays in the light beam to the radial deformation evaluation surface, a wavefront on the radial deformation evaluation surface can be acquired.

A difference between this wavefront and the ideal wavefront is a sum of various aberrations of the optical system. In the sum of various aberrations, as shown in, e.g., FIG. 13, a component of the wavefront having a convex shape or a concave shape that is rotational symmetric with a position of the optical axis O at the center is radial deformation.

It is to be noted that, in a later-described fourth process, there is carried out, e.g., a method for adjusting an air gap between respective optical elements by changing a thickness of a washer between body tubes holding optical elements, a method for shifting the optical element in a vertical direction with respect to the optical axis, a method for tilting the optical element with a direction vertical to the optical axis being determined as an axis, a method for rotating the optical element around the optical axis, or the like, which are known as an adjustment method for minimizing deteriorations in optical performances. Therefore, in the real ray tracing processing, the real ray tracing is effected by creating a model of the optical system taking a state in which one of these adjustment methods is finished (state in which a manufacturing error, a gap, an eccentricity, rotation or the like of the optical element 1 has been adjusted) into consideration. As a result, a prediction accuracy of radial deformation based on the simulation is enhanced.

As a method for calculating the radial deformation from a difference between the wavefront and the ideal wavefront, which is a sum of various aberrations of the optical system, there is the following method, for example. A difference between the wavefront and the ideal wavefront is approximated to a function representing a shape component in which each term is independent as indicated by, e.g., a Zernike polynomial of Equation (2). Then, a size and a range of the radial deformation are calculated from a sum $W(X, Y)$ of terms representing the rotational symmetry component indicated by Equation (3) excluding a secondary component of this function.

A column of the Zernike polynomial using up to sextic terms will now be shown.

$$Z(X, Y) = C1 + C2X + C3Y + C4[2(X^2 + Y^2) - 1] + \\ C5(X^2 - Y^2) + C6[2XY] + C7[3(X^3 + XY^2) - 2X] + \\ C8[3(X^2Y + Y^3) - 2Y] + C9[6(X^4 + 2X^2Y^2 + Y^4 - X^2 - Y^2) + 1] + \\ C10[X^3 - 3XY^2] + C11[3X^2Y - Y^3] + \\ C12[4(X^4 - y^4) - 3(x^2 - y^2)] + C13[8(X^3Y + XY^3) - 6XY] + \\ C14[10(X^5 + 2X^3Y^2 + XY^4) - 12(X^3 + XY^2) + 3X] + \\ C15[10(X^4Y + 2X^2Y^3 + Y^5) - 12(X^2Y + Y^3) + 3Y] + \\ C16[20(X^6 + 3X^4Y^2 + 3X^2Y^4 + Y^6) - \\ 30(X^4 + 2X^2Y^2 + Y^4) + 12(X^2 + Y^2) - 1]$$ (2)

$$W(X, Y) = C9[6(X^4 + 2X^2Y^2 + Y^4 - X^2 - Y^2) + 1] + \\ C16[20(X^6 + 3X^4Y^2 + 3X^2Y^4 + Y^6) - \\ 30(X^4 + 2X^2Y^2 + Y^4) + 12(X^2 + Y^2) - 1]$$ (3)

Here, Cj is a coefficient of a jth term, and (X, Y) is a coordinate position on the evaluation surface.

A size of the radial deformation at, e.g., a position of the optical axis O can be obtained based on W(0, 0) from Equation (2) by assuming that X=0 and Y=0. A range of the radial deformation can be obtained from a range of a diameter with which a convex shape or a concave shape is formed with the position of the optical axis O at the center by acquiring the size of the radial deformation while shifting the coordinate position in the X direction or the Y direction. The radial deformation may be generated in a bracelet-like form, and an inside diameter and an outside diameter become the range in this case.

On the other hand, a description will be given as to an example of simulation processing which obtains a size and a range of the radial deformation in a simple manner without using the real ray tracing processing.

In the shape measurement of the surface k (measurement target surface) of the optical element 1, a difference between the measured surface k and the ideal surface is obtained, and it is approximated to a function representing a shape component in which each term is independent like the Zernike polynomial shown in, e.g., Equation (2) like the above-described example of the wavefront.

Then, $W_k(x_k, y_k)$ is obtained by using Equation (3) which is a sum of terms representing the rotational symmetric component in the function. Assuming that a position on the radial deformation evaluation surface is (X, Y), $X_k$ and $Y_k$ are determined as follow, for example.

$$X_k = (E_k/E) \cdot X$$ (4)

$$Y_k = (E_k/E) \cdot Y$$ (5)

where, E is a light beam diameter on the radial deformation evaluation surface, and $E_k$ is a light beam diameter on the surface k (measurement target surface).

Then, $W_k$ is obtained on all the surfaces k (measurement target surfaces), and a sum of values each of which is obtained by multiplying each $W_k$ by the refraction index $n_k$ of the optical element 1 represents a size W'(X, Y) of the radial deformation on the radial deformation evaluation surface shown in Equation (6).

$$W'(X,Y) = \Sigma W_k(x_k, y_k) \cdot n_k$$ (6)

In case of the simulation processing that obtains the size and the range in the simple manner, since almost all of the influences of refraction of light rays in the optical system or the like are ignored, the accuracy is lower than that of the simulation using the real ray tracing, but the level of the accuracy of the calculated value of the radial deformation height W'(0, 0) at the position of the optical axis O using Equation (6) is equivalent to that based on the real ray tracing, and the processing is facilitated since the real ray tracing is not used, thereby shortening a processing time.

A second process #2 will now be described. At least a surface of at least an optical element 1 whose surface shape is measured in the first processes #1-1 and #1-2 is determined as a correction processing target surface, and a surface shape or a change quantity of the surface shape that is used to correct the radial deformation when assembling and adjusting the optical system predicted by simulation of the arithmetic operation processing device 3 is calculated.

Here, a description will be given as to a method for calculating the surface shape or the change quantity of the surface shape of the optical element 1 as the correction processing target surface.

Figure 5:
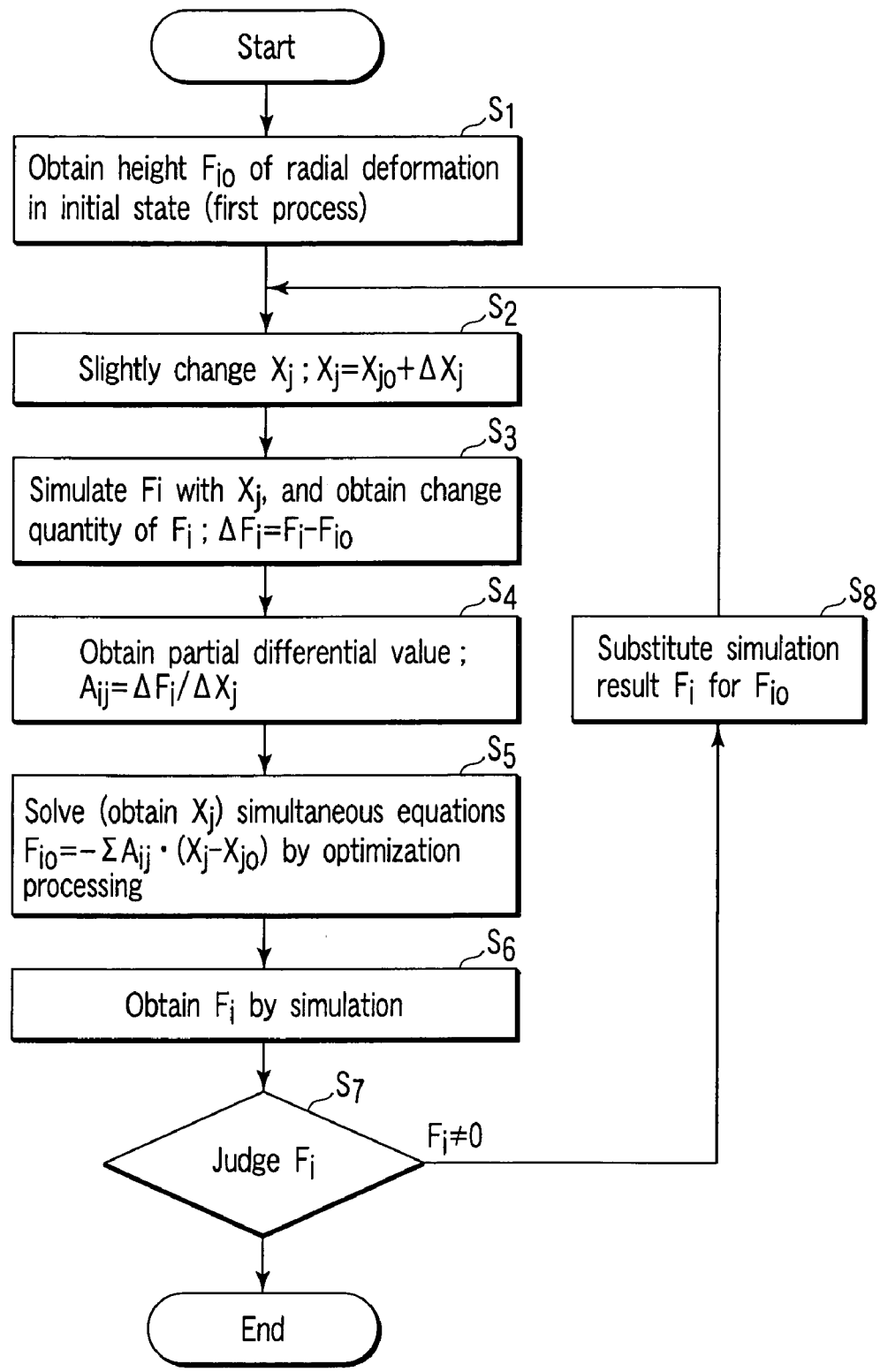
FIG. 5 is a flowchart for calculating a shape or a change quantity of the shape of a correction processing target surface by using optimization processing in the radial deformation adjustment method.

FIG. 5 is a flowchart that is used to calculate the surface shape or the change quantity of the surface shape of the optical element 1 as the correction processing target surface by using optimization processing. For example, a height of the radial deformation at an ith position on the radial deformation evaluation surface as an evaluation function $F_i(X_1, X_2, X_3, \ldots, X_n; i=1, 2, 3, \ldots, m)$ and a difference between the surface shape of the optical element 1 that becomes the correction processing target surface and the ideal surface as a variable $X_j (j=1, 2, 3, \ldots, n)$ are determined as coefficient values ($C_9$, $C_{16}$ and the like) of terms of rotation symmetric components when approximated to a function such as the Zernike polynomial shown in Equation (2), and a simultaneous equation shown in Equation (7) is achieved.

$$F_{i0} = -\Sigma A_{ij} \cdot (X_j - X_{j0}) \tag{7}$$

Here, $A_{ij} = \delta F_i / \delta X_j$, and this is a partial differential value.

The height of the radial deformation at the ith position on the radial deformation evaluation surface predicted in the first process is determined as the evaluation function value $F_{i0}$, and the coefficient value of the jth term of the rotation symmetric component when the difference between the surface shape of the optical element 1 that becomes the correction processing target surface measured in the first process and the ideal surface is approximated to a function such as the Zernike polynomial is determined as $X_{j0}$. As to the evaluation function value $F_{i0}$ in this example, the height of the radial deformation in the initial state at a step $S_5$ shown in FIG. 5 is obtained. For example, assuming that the polynomial when the difference between the surface shape of the optical element 1 and the ideal surface is approximated is Equation (2), the rotational symmetric component that affects the radial deformation is represented by Equation (3). At this time the variables $X_j$ are $C_9$ and $C_{16}$.

When the polynomial using up to a higher-order term is utilized, the number of variables to be used can be increased, and the surface shape or the change quantity of the surface shape of the optical element 1 that becomes the correction processing target surface that enables correction of the radial deformation of the optical system can be highly accurately calculated. In this case, the rotation symmetric component of the necessary order may be selected in accordance with a shape of the radial deformation or the like.

In regard to the partial differential value $A_{ij}$, at a step $S_2$, a variable $X_j$ is slightly changed, and the radial deformation is simulated in this state at a step $S_3$ like the first process. At a step $S_4$, the partial differential value $A_{ij}$ is calculated by obtaining the following change quantity of the radial deformation height evaluation function $F_i$, which is a simulation result at the ith position on the radial deformation evaluation surface with respect to a unit change quantity of the coefficient value of the jth term of the rotational symmetric component when the difference between the surface shape of the optical element 1 that becomes a correction processing target surface and the ideal surface is approximated to the function of the polynomial.

$$\Delta F_i / \Delta X_j = (F_i - F_{i0}) / \Delta X_j \tag{8}$$

Then, at a step $S_5$, in order to solve the simultaneous equation shown in Equation (7), optimization processing based on, e.g., a least squares method is carried out, thereby obtaining the variable $X_j$.

Subsequently, at a step $S_6$, the surface shape of the optical element 1 that becomes a new correction processing target surface is formed by using the variable $X_j$, and the radial deformation $F_i$ is simulated. In this simulation, at the step $S_6$, optimization is effected until Equation (6) is satisfied, i.e., the radial deformation $F_i$ sufficiently approximates 0.0.

Then, if the radial deformation $F_i$ after optimization is not sufficiently 0.0 based on a judgment at a step $S_7$, a simulation result $F_i$ is substituted for $F_{i0}$, the variable $X_j$ calculated by optimization is substituted for the variable $X_{j0}$, the partial differential value $A_{ij}$ is again calculated, and the optimization processing is repeatedly carried out at a step $S_8$. The variable $X_j$ calculated by this optimization processing is a coefficient value of the term of the rotation symmetric component obtained when the difference between the surface shape of the optical element 1 that becomes a correction processing target surface that enables correction of the radial deformation and the ideal surface is approximated to the function of the polynomial. The surface shape or the change quantity of the surface shape of the optical element 1 that becomes the correction processing target surface at an arbitrary position of the surface shape of the optical element 1 can be calculated based on the function according to the term of the rotational symmetric component.

A third process #3 will now be described. Correction processing is applied to the surface of the optical element 1 based on the surface shape or the change quantity of the surface shape of the optical element 1 that becomes the correction processing target surface that enables correction of the radial deformation calculated in the second process #2. A correction processing machine 5 using in this correction processing can polish a specified finishing correction quantity at a position specified on the surface of the optical element 1. After the correction processing of the surface of the optical element 1, deposition of, e.g., an anti-reflection film is applied on the surface of the optical element 1 subjected to the correction processing according to needs.

A fourth process #4 will now be described. This process assembles and adjusts the optical system including the optical element 1 subjected to the correction processing in order to have a surface shape that enables correction of the radial deformation in the third process #3 and the optical element 1 used in measurement of the surface shape in the first process. This adjustment is carried out by, e.g., a method for adjusting an air gap between the respective optical elements 1 by changing a thickness of a washer between body tubes holding the optical elements 1, a method for shifting the optical element 1 in the vertical direction with respect to the optical axis O, a method for tilting the optical element 1 with a direction vertical to the optical axis O being determined as an axis, a method for rotating the optical element 1 around the optical axis O or the like which is known as the adjustment method for minimizing deteriorations in optical performances.

Figure 6:
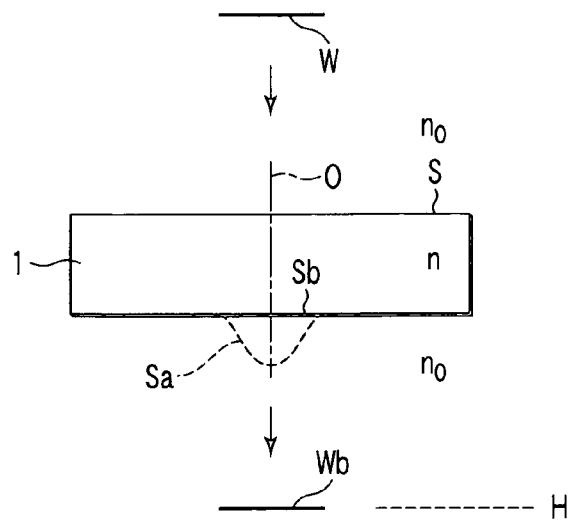
FIG. 6 is a view showing an optical element as a result of correcting the radial deformation by the radial deformation adjustment method.

For example, the optical element 1 in which the radial deformation is generated shown in FIG. 13 is subjected to the correction processing as shown in FIG. 6. As a result, the optical element 1 has a surface shape that enables correction of the radial deformation that an outgoing surface Sb is generated from an outgoing surface Sa for light. Further, the optical system including this optical element 1 is assembled and adjusted.

As a result, when the light is to reach the outgoing surface Sb after being transmitted through the optical element 1, since the shape of the outgoing surface Sb is flatly formed, all light rays including the light rays close to the optical axis O and the light rays far from the optical axis O have the same distance advancing in the plane-parallel plate of the optical element 1 having the refractive index n. As a result, the light is projected with the plane wave equivalent to the plane wave that has entered without being affected by refraction. Therefore, the projected plane wave Wb matches with the ideal wavefront.

As described above, in the first embodiment, the shape of at least a surface of the optical element 1 is measured and the radial deformation generated when actually assembling the optical system is predicted based on simulation by using a result of the surface shape measurement of this optical element 1 in the first processes #1-1 and #1-2; at least a surface of the optical element 1 whose shape is measured is determined as a correction processing target surface, and a surface shape or a change quantity of the surface shape that is used to correct the radial deformation predicted based on simulation is calculated in the second process #2; the correction processing is applied to the surface of the optical element 1 based on the surface shape or the change quantity of the surface shape of the optical element 1 that becomes the correction processing target surface that enables correction of the radial deformation in the third process #3; and the optical system including the optical element 1 subjected to the correction processing and the optical element 1 used in measurement of the surface shape in the first process is assembled and adjusted in the fourth process #4. As a result, the radial deformation of the optical system can be readily adjusted, and the optical system with the high performances can be manufactured with the low cost.

Further, in the first embodiment, since the radial deformation of the optical system is obtained in simulation, one installment of actually assembling and adjusting the optical system can suffice. Furthermore, since the radial deformation is corrected by applying the correction processing to the surface shape of the optical element essentially constituting the optical system rather than newly adding a radial deformation adjustment optical element to the optical system, the number of optical elements 1 is not increased, which does not result in the high cost.

Figure 7:
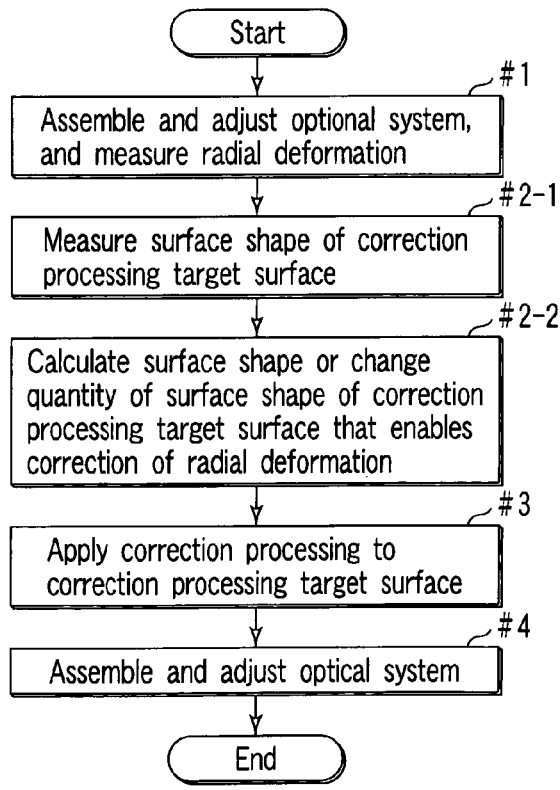
FIG. 7 is a flowchart showing a second embodiment of an optical system radial deformation adjustment method according to the present invention.

A second embodiment according to the present invention will now be described. FIG. 7 is a flowchart of an optical system radial deformation adjustment method.

In a first process #1, the optical element 1 is assembled. After the assembling, there is carried out adjustment that suppresses deteriorations in optical performances of the optical element to the minimum level. This adjustment is carried out by, e.g., a method for adjusting an air gap between the respective optical elements 1 by changing a thickness of a washer between body tubes holding the optical elements 1, a method for shifting the optical element 1 in a vertical direction with respect to the optical axis O, a method for tilting the optical element 1 with a direction vertical to the optical axis O being determined as an axis, a method for rotating the optical element 1 around the optical axis O, and the like, which are known methods.

After assembling and adjusting the optical element 1, the radial deformation is measured. This radial deformation measurement measures a wavefront that has been transmitted through the optical system by using an interferometer (e.g., the interference measuring instrument 2), and a reference wavefront is set as an ideal wavefront of the wavefront that has been transmitted through the optical system and it is caused to interfere with the wavefront that has been transmitted through the optical system. A difference between the transmitted wavefront of the optical system and the ideal wavefront is calculated by analyzing an image of interference fringes generated due to this interference. Then, the difference is approximated to a function in which each term represents an independent component like the Zernike polynomial shown in Equation (2), for example. Subsequently, as indicated by Equation (3), a size and a range of the radial deformation are obtained based on a sum $W(X, Y)$ of the terms representing rotational symmetric components excluding a secondary component of this function.

Second processes #2-1 and #2-2 will now be described. In the second process #2-1, the arithmetic operation processing device 3 is used to measure a shape of a correction processing target surface that is used to correct the radial deformation of at least a surface of the optical element 1 such as a lens constituting the optical system.

Subsequently, in the second process #2-2, a shape and a change quantity of the correction processing target surface that enables correction of the radial deformation are calculated by using the arithmetic operation processing device 3. The shape and change quantity of the correction processing target surface are calculated by solving the simultaneous equation indicated by Equation (6) from the Equation (3) obtained in the first process and the measurement result obtained in the process #2-1 based on optimization processing such as a least squares method. It is to be noted that the shape of the correction processing target surface may be measured before assembling the optical system in the first process #1.

The next third and fourth processes #3 and #4 are the same as those in the first embodiment.

As described above, according to the second embodiment, the radial deformation is measured by performing the adjustment to suppress deteriorations in optical performances of the optical element 1 to the minimum level after assembling the optical element 1, the shape of the correction processing target surface that is used to correct the radial deformation of the optical element 1 is then measured, and the shape and change quantity of the correction processing target surface that are used to correct the radial deformation are calculated. As a result, the radial deformation of the actually assembled and adjusted optical system is measured, and the shape of the correction processing target surface that can be used to correct the radial deformation can be highly accurately calculated as compared with the method using a value obtained by simulation. Additionally, as to measurement of the surface shape of the optical element 1, measuring at least the correction processing target surface alone can suffice. Further, like the first embodiment, since the radial deformation is corrected by applying the correction processing to the surface shape of the optical element 1 essentially constituting the optical system, correction is enabled without increasing the number of optical elements 1, which does not result in the high cost.

Figure 8:
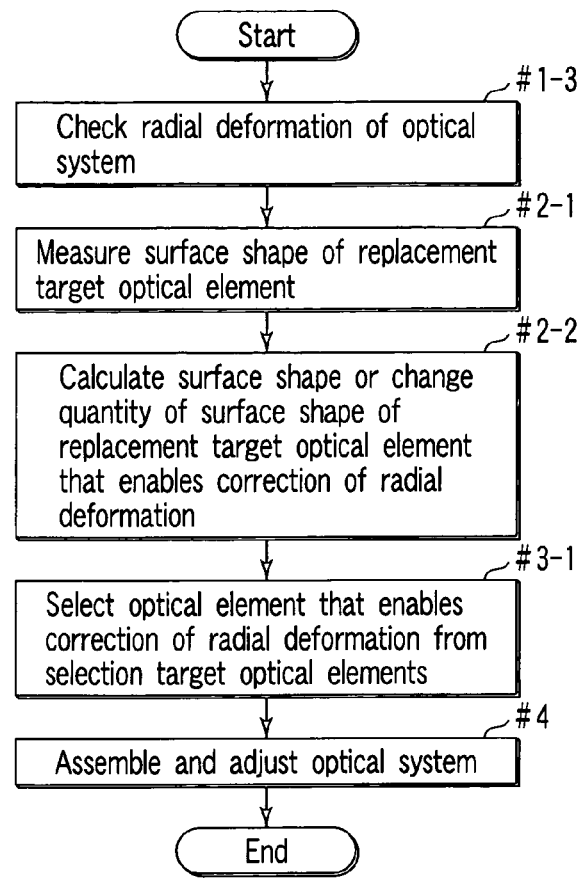
FIG. 8 is a flowchart showing a third embodiment of an optical system radial deformation adjustment according to the present invention.

A third embodiment according to the present invention will now be described. FIG. 8 is a flowchart of an optical system radial deformation adjustment method.

This third embodiment can replace at least an optical element 1 (this optical element will be referred to as a replacement target optical element hereinafter) in the optical system without applying correction processing to a correction processing target surface of the optical element 1.

In a first process #1-3, radial deformation of the optical system is checked by simulation or measurement using the arithmetic operation processing device 3. In this first process

1-3, either the first processes #1-1 and #1-2 or the first process #1 described in conjunction with the first or second embodiment is carried out.

Then, in a second process #2-1, a surface shape of the replacement target optical element is measured. In this case, at least an optical element 1 in the optical elements 1 or the optical element 1 constituting the optical system is determined as a replacement target optical element. In case of, e.g., predicting the radial deformation by simulation in the first process #1-3, the measurement of the surface shape of the replacement target optical element may be carried out in the first process #1-3.

In a second process #2-2, a surface shape or a change quantity of the surface shape of the replacement target optical element that can be used to correction the radial deformation is calculated by the arithmetic operation processing device 3. This calculation method solves the simultaneous equation indicated by Equation (7) by using, e.g., optimization like the second process #2 or the second processes #2-1 and #2-2 described in conjunction with the first or second embodiment.

A third process #3-1 will now be described. In this third process #3-1, the arithmetic operation processing device 3 is used to select the optical element 1 that enables correction of the radial deformation of the optical system when incorporated in the optical system in place of the replacement target optical element from at least a replacement target optical element.

It is presumed that the shape of the surface of at least a replacement target optical element that affects the radial deformation is measured in advance. As a result, there exists the replacement target optical element having a surface shape that enables correction in accordance with irregularities in height and range of the radial deformation to be generated. For example, as indicated by Equation (3), irregularities are given to a coefficient $C_j$ of a sum $W(X, Y)$ of terms that approximate a difference between the surface shape of the replacement target optical element and the ideal surface.

In the method for selecting the replacement target optical element, the optical element 1 having the surface shape close to the surface shape of the replacement target optical element that enables correction of the radial deformation is selected from the replacement optical element by using the surface shape or the change quantity of the surface shape of the replacement target optical element that enables correction of the radial deformation calculated in the second process #2-2.

Before advancing to the next process, the radial deformation generated when the selected optical element is assembled in the optical system is predicted by simulation, and a confirmation is made upon whether this radial deformation can be excellently corrected like the first processes #1-1 and 1-2 described in conjunction with the first embodiment. Furthermore, in case of producing the optical systems in large quantities, generation of the radial deformation of the optical systems is statistically grasped, and the radial deformation is classified based on a distribution of a generation frequency of each of a height and a range thereof. In regard to this classification, it is good enough to classify the radial deformation in such a manner that probability densities of respective classes become the same, for example. The surface shapes of the replacement target optical elements, which are prepared in accordance with respective classes, are also classified based on the surface shapes that enables correction of the radial deformation.

By performing classification and associating the surface shape that enables correction of the radial deformation in accordance with a size of the radial deformation, selection of the optical element from the replacement target optical elements can be facilitated.

Moreover, a quantity, numbering, surface shape data and others of the replacement target optical element in each class are managed. The surface shape data is a coefficient of each term when a difference between the ideal surface and the measured surface shape is approximated to a function in which each term represents an independent shape component like the Zernike polynomial indicted by Equation (2), which is a sum $W_k(X_k, Y_k)$ of terms representing rotational symmetric components of the function as indicated by Equation (3), for example.

Figure 9:
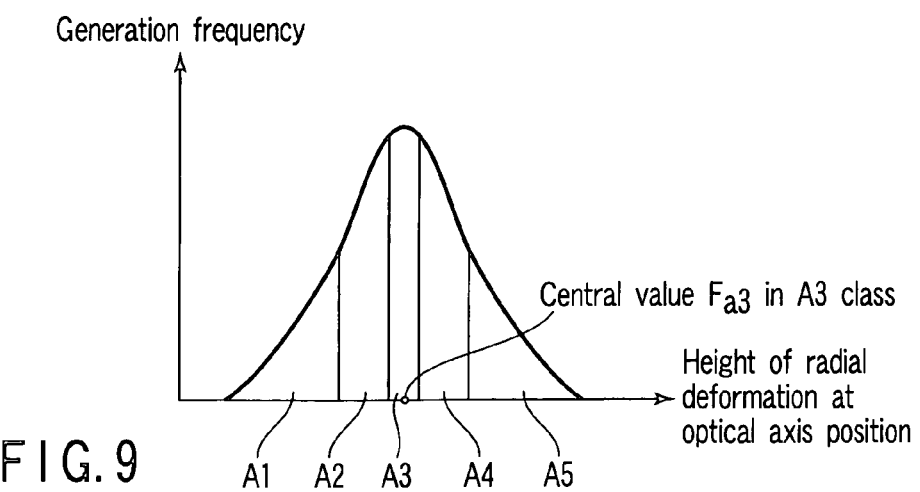
FIG. 9 is a view showing a graph of a generation frequency of a height of radial deformation at a position of an optical axis O when an optical system is assembled in the radial deformation adjustment method.

FIG. 9 to 12 show classification and surface shape data management of the replacement target optical elements. Of these drawings, FIG. 9 is a graph showing a generation frequency of a height of the radial deformation at a position of the optical axis O when the optical system is assembled. In this drawing, for example, in regard to each class of the replacement target optical elements, a width of the height of the radial deformation to be generated is divided into, e.g., five classes (A1 to A5) in such a manner they have the same probability density.

Figures 10, 11:
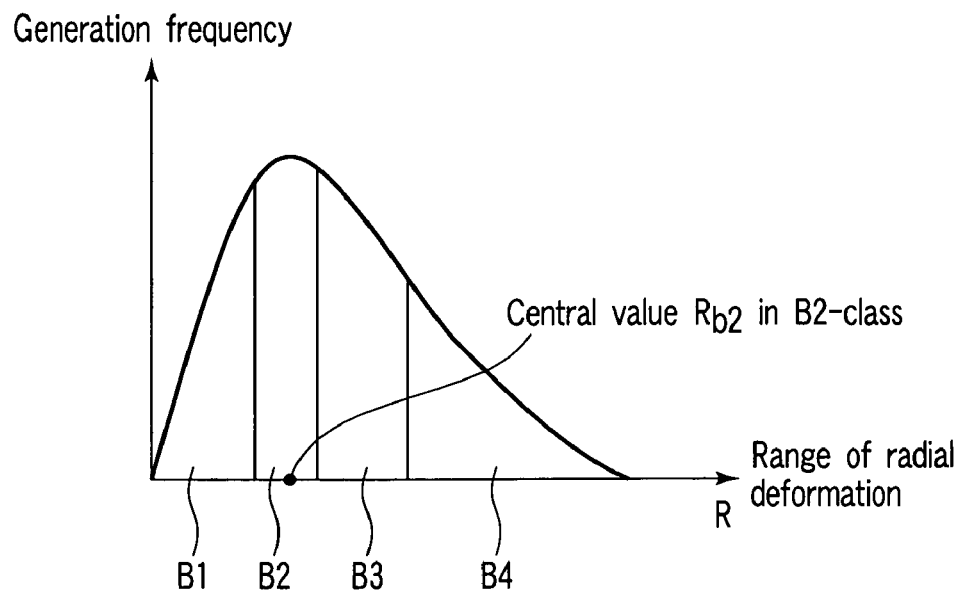
FIG. 10 is a view showing a graph of a generation frequency of a range of radial deformation when the optical system is assembled in the radial deformation adjustment method.
FIG. 11 is a view showing a matrix when replacement target optical elements are classified in the radial deformation adjustment method.

FIG. 10 is a graph showing a generation frequency of a range of the radial deformation when the optical system is assembled. Respective widths of the range of the radial deformation to be generated that are to be classified are divided into, e.g., five classes B1 to B5 in such a manner that they have the same probability density.

Based on such classification, the replacement target optical elements can be represented by a 5×4 matrix constituted of the respective classes A1 to A5 and B1 to B5 such as shown in FIG. 11. A class in the 5×4 matrix to which the replacement target optical element belongs can be confirmed by, e.g., solving the simultaneous equation indicated by Equation (7) or checking how much the radial deformation is corrected by simulation like the process described in conjunction with the first embodiment. For example, in case of checking whether the replacement target optical element belongs to a class A3–B2 in the matrix, there is confirmed whether the height of the radial deformation of the replacement target optical element at the position of the optical axis is corrected with a central value $F_{a3}$ of the class A3, or whether it can be corrected at an arbitrary position in the radial deformation range, i.e., within a range that a length from the optical axis position in the class B2 is ½ of a central value $R_{b2}$ ($=R_{b2}/2$) of the class B2 as shown in FIG. 10. At this time, a level of application of the correction D is defined as indicated by the following Equation (9). If the level of application of the correction D is not more than a fixed quantity, it is determined that the correction can be excellently applied, and the class of the replacement target optical element is determined.

$$D = \Sigma |F_i \cdot w_i| \tag{9}$$

where $F_i$ is an ith radial deformation height, and $w_i$ is a weight of the ith radial deformation height.

Classification is carried out in connection with the height of the radial deformation other than the optical axis position according to needs, and the accuracy to select the optical element in which the radial deformation is excellently corrected from the replacement optical elements can be enhanced by increasing the order of the matrix.

Further, if the correction coefficient $A_{ij}$ of each of the coefficients C9 and C16 when the difference between the surface shape of the replacement target optical element and the ideal shape with respect to the radial deformation of the optical system is approximated to Equation (2) is confirmed in advance, classification may be effected based on magnitudes of values of the respective coefficients C9 and C16.

Furthermore, each replacement target optical element classified as shown in FIG. 12 has a number N given thereto, and is managed based on the coefficient $C_i$ approximated to the Zernike polynomial shown in Equation (2) calculated from a measurement result of the surface shape or the like, a value at an arbitrary position indicated by Equation (3), a value at an arbitrary position W'(x, y) indicated by Equation (6) and others.

By performing classification of the replacement target optical element and data management of the surface shape in this manner, the radial deformation can be excellently corrected from the replacement target optical element with respect to the radial deformation to be generated, and a probability that an excessive correction or an insufficient correction is carried out can be suppressed. As a result, the optical systems can be efficiently manufactured in large quantities.

A fourth process #4 will now be described. In this fourth process #4, the optical element selected in the third process #3-1 is changed with the replacement target optical element, and the optical system is assembled and adjusted like the fourth process #4 in the radial deformation adjustment method described in conjunction with the first or second embodiment. In this radial deformation adjustment method, replacement with the optical element 1 having a surface shape that enables correction of the radial deformation is performed in place of carrying out the correction processing to obtain the surface shape that enables correction of the radial deformation. As a result, the radial deformation of the optical system can be excellently adjusted.

As described above, according to the third embodiment, since the correction processing is not applied to the surface shape of the optical element 1, it is not necessary to again effect deposition of, e.g., an anti-reflection film with respect to the correction processing target surface.

It is to be noted that this invention is not restricted to the foregoing embodiments as it is, but constituent elements can be modified and embodied without departing from the scope of the invention on the embodying stage.

For example, the radial deformation adjustment method in the third embodiment may be modified as follows.

The correctable surface shape of the replacement target optical element according to the radial deformation is discrete. Therefore, even if the optical element selected in the third process #3-1 is change with the replacement target optical element, there occurs a situation in which the radial deformation cannot be excellently corrected.

Whether the radial deformation can be excellently corrected can be checked by prediction of the radial deformation based on simulation in the radial deformation adjustment method of the arithmetic operation processing device 3 or measurement of the radial deformation after assembling and adjusting the optical system in the first or second embodiment.

If the radial deformation cannot be excellently corrected, in the third process #3, the correction processing is applied to obtain the surface shape of the selected optical element based on the surface shape or the change quantity of the surface shape that enables correction calculated in the second process #2 like the third process #3 in the radial deformation adjustment method described in conjunction with the first or second embodiment. The optical element subjected to the correction processing is incorporated in the optical system and assembling and adjustment are carried out, thereby further excellently correcting the radial deformation.

Additionally, since the selected optical element has a surface shape close to the surface shape that enables correction, the correction processing can be easily applied to this optical element. As compared with the third process in the radial deformation adjustment method described in the first or second embodiment, a correction processing quantity is small, and a processing time can be reduced.

Presuming that the surface shape of the thus selected optical element is subjected to the correction processing, the optical element having the surface shape to which the correction processing can be readily applied is selected, and the optical element to which the correction processing is applied in order to have the surface shape that enables correction of the radial deformation is changed with the replacement target optical element, thereby assembling and adjusting the optical system. Therefore, a time required for the radial deformation adjustment process can be reduced, and the optical system with high performances can be manufactured.

Further, various inventions can be formed by appropriate combinations of constituent elements disclosed in the foregoing embodiments. For example, some constituent elements can be eliminated from all the constituent elements disclosed in the embodiments. Furthermore, constituent elements in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A optical system radial deformation adjustment method comprising:
    predicting radial deformation generated when an optical system comprising at least an optical element is assembled;
    calculating a surface shape and a change quantity of the optical element that are used to correct the predicted radial deformation;
    applying correction processing to the surface of the optical element based on the calculated surface shape and change quantity of the optical element; and
    assembling and adjusting the optical system by using the optical element to which the correction processing is applied as the optical element from which the radial deformation is predicted.

2. The optical system radial deformation adjustment method according to claim 1, wherein the prediction of the radial deformation measures a surface shape of at least a surface of at least an optical element constituting the optical system, and
    predicts the radial deformation generated when the optical system is actually assembled based on simulation by using a measurement result of the surface shape of the optical element.

3. The optical system radial deformation adjustment method according to claim 1, wherein the prediction of the radial deformation measures a surface shape of the optical element by using a three-dimensional measuring instrument or an interference measuring instrument.

4. The optical system radial deformation adjustment method according to claim 1, wherein, in real ray tracing used in the simulation, a component having a rotational symmetric convex shape or concave shape with an optical axis position of the optical system at the center is judged as the radial deformation in a sum of various aberrations of the optical system that is a difference between a wavefront on a radial deformation evaluation surface of the optical system on which the radial deformation is evaluated and an ideal wavefront.

5. The optical system radial deformation adjustment method according to claim 1, wherein the calculation of the surface shape and change quantity of the optical element calculates a surface shape and a change quantity of the optical element that are used to correct the radial deformation of the optical system predicted by simulation with at least a surface of the optical element whose surface shape is measured being determined as a correction processing target surface.

6. The optical system radial deformation adjustment method according to claim 5, wherein the calculation of the surface shape and change quantity of the optical element uses optimization processing in the calculation of the surface shape and change quantity of the optical element.

7. An optical system radial deformation adjustment method comprising:
measuring radial deformation generated in an optical system comprising at least an optical element after assembling and adjusting the optical system;
measuring a shape of a correction processing target surface on which the radial deformation of the optical system is generated, and calculating a shape and a change quantity of the correction processing target surface that are used to correct the radial deformation;
correcting the radial deformation by applying correction processing to the correction processing target surface of the optical element based on the shape and change quantity of the correction processing target surface; and
assembling and adjusting the optical system including the optical element to which the correction processing is applied and the optical element from which the radial deformation is measured.

8. The optical system radial deformation adjustment method according to claim 7, wherein the measurement of the radial deformation assembles and adjusts the optical system by using one of a method for adjusting an air gap between the respective optical elements by changing a thickness of a washer between body tubes holding the optical elements, a method for shifting the optical element in a vertical direction with respect to an optical axis, a method for tilting the optical element with a direction vertical to the optical axis being determined as an axis, and a method for rotating the optical element around the optical axis, and measures the radial deformation generated in the optical system by using an interferometer.

9. The optical radial deformation adjustment method according to claim 7, wherein the calculation of the surface shape and change quantity of the correction processing target surface comprises:
measuring a shape of at least a surface of the optical element constituting the optical system; and
calculating the shape and change quantity of the correction processing target surface that are used to correct the radial deformation of the optical system based on a measurement result of the surface shape by optimization processing.

10. An optical system radial deformation adjustment method comprising:
measuring radial deformation generated in an optical system comprising at least an optical element;
measuring surface shapes of exchangeable replacement target optical elements among the optical elements in the optical system, and calculating surface shapes and their change quantities of the replacement target optical elements that enable correction of the radial deformation;
selecting the replacement target optical element that enables correction of the radial deformation from the replacement target optical elements; and
assembling and adjusting the optical system by using the selected replacement target optical element.

11. The optical system radial deformation adjustment method according to claim 10, wherein the selection of the replacement target optical element prepares the replacement target optical elements having surface shapes that enable correction in accordance with irregularities in height and range of the radial deformation generated in the optical system, and
selects the optical element that approximates the calculated surface shape and change quantity of the replacement target optical element from the replacement target optical elements.

12. The optical system radial deformation adjustment method according to claim 11, wherein the irregularities in height and range of the radial deformation generated in the optical system are those obtained by giving irregularities to a coefficient of a term representing a rotational symmetric component excluding a secondary component in a polynomial that affects the radial deformation when a difference between the surface shape of the optical element and an ideal surface is approximated by using a function of the polynomial.

13. The optical system radial deformation adjustment method according to claim 11, wherein the replacement target optical elements are classified into classes and managed based on a distribution of each generation frequency with respect to the height and the range of the radial deformation, and the replacement target optical element is selected from the classes.

14. The optical system radial deformation adjustment method according to claim 13, wherein the classification uniforms probability densities of the respective classes.

15. The optical system radial deformation adjustment method according to claim 14, wherein the surface shapes of the replacement target optical elements, which are prepared in accordance with the classification, are also classified based on the surface shape that enables correction of the radial deformation.

16. An optical system radial deformation adjustment method comprising:
measuring radial deformation generated in an optical system comprising at least an optical element;
measuring surface shapes of exchangeable replacement target optical elements among the optical elements in the optical system, and calculating surface shapes and their change quantities of the replacement target optical elements that enable correction of the radial deformation;

selecting the replacement target optical element that enables correction of the radial deformation from the replacement target optical elements;

applying correction processing to a surface shape of the selected replacement target optical element based on the calculated surface shape and change quantity of the replacement target optical element; and assembling and adjusting the optical system by using the replacement target optical element to which the correction processing is applied.

17. The optical system radial deformation adjustment method according to claim 16, wherein the selection of the replacement target optical system prepares the replacement target optical systems having surfaces shapes that enable correction in accordance with irregularities in height and range of the radial deformation generated in the optical system, and selects the optical element that approximates the calculated surface shape and change quantity of the replacement target optical element from the replacement target optical elements.

18. The optical system radial deformation adjustment method according to claim 17, wherein the irregularities in height and range of the radial deformation generated in the optical system are those obtained by giving irregularities to a coefficient of a term representing a rotational symmetric component excluding a secondary component in a polynomial that affects the radial deformation when a difference between the surface shape of the optical element and an ideal surface is approximated based on a function of the polynomial.

19. The optical system radial deformation adjustment method according to claim 17, wherein the replacement target optical elements are classified into classes and managed based on a distribution of each generation frequency with respect to the height and the range of the radial deformation, and the replacement target optical element is selected from the classes.

20. The optical system radial deformation adjustment method according to claim 19, wherein the classification uniforms probability densities of the respective classes.

21. The optical system radial deformation adjustment method according to claim 20, wherein the surface shapes of the replacement target optical elements prepared in accordance with the classification are also classified based on the surface shape that enables correction of the radial deformation.

22. An optical system radial deformation adjustment system comprising:

a prediction device that predicts radial deformation generated when an optical system comprising at least an optical element is assembled;

an arithmetic operation device that calculates a surface shape and a change quantity of the optical element that are used to correct the radial deformation predicted by the prediction device; and a correction processing machine that applies correction processing to the surface of the optical element based on the surface shape and change quantity of the optical element calculated by the arithmetic operation device, wherein the optical system is assembled and adjusted by using the optical element to which the correction processing is applied by the correction processing machine as the optical element from which the radial deformation is predicted by the prediction device.

23. The optical system radial deformation adjustment system according to claim 22, wherein the prediction device comprises:

a three-dimensional measuring instrument or an interference measuring instrument that measures a shape of at least a surface of at least an optical element constituting the optical system; and a simulation device that predicts the radial deformation generated when the optical system is actually assembled based on simulation by using a measurement result of the surface shape of the optical element obtained by the three-dimensional measuring instrument or the interference measuring instrument.

24. The optical system radial deformation adjustment system according to claim 23, wherein the simulation device judges a component having a convex shape or a concave shape that is rotational symmetric with an optical axis position of the optical system at the center as the radial deformation in a sum of various aberrations of the optical system that is a difference between a wavefront on a radial deformation evaluation surface on which the radial deformation in the optical system is evaluated and an ideal wavefront.

25. The optical system radial deformation adjustment system according to claim 23, wherein the arithmetic operation device calculates a surface shape and a change quantity of the optical element that are used to correct the radial deformation of the optical system predicted by the simulation by using optimization processing with at least a surface of the optical element whose surface shape is measured being determined as a correction processing target surface.

26. An optical system radial deformation adjustment system comprising:

a measurement device that measures radial deformation generated in an optical system comprising at least an optical element after assembling and adjusting the optical system;

an arithmetic operation device that measures a shape of a correction processing target surface of the optical element that affects generation of the radial deformation in the optical system, and calculates a shape and a change quantity of the correction processing target surface that are used to correct the radial deformation; and a correction processing machine that corrects the radial deformation by applying correction processing to the correction processing target surface of the optical element based on the shape and change quantity of the correction processing target surface, wherein the optical system including the optical element to which the correction processing is applied and including the optical element from which the radial deformation is measured are assembled and adjusted.

27. An optical system radial deformation adjustment system comprising:

a measurement device that measures radial deformation generated in an optical system comprising at least an optical element;

an arithmetic operation device that measures surface shapes of exchangeable replacement target optical elements among the optical elements in the optical system, and calculates surface shapes and their change quantities of the replacement target optical element that enable correction of the radial deformation; and a selector that selects the replacement target optical element that enables correction of the radial deformation from the replacement target optical elements, wherein the optical system is assembled and adjusted by using the replacement target optical element selected by the selector.

28. An optical system radial deformation adjustment system comprising:
a measurement device that measures radial deformation generated in an optical system comprising at least an optical element;
an arithmetic operation device that measures surface shapes of exchangeable replacement target optical elements among the optical elements in the optical system, and calculates surface shapes and their change quantities of the replacement target optical elements that enable correction of the radial deformation;
a selector that selects the replacement target optical element that enables correction of the radial deformation from the replacement target optical elements; and
a correction processing machine that applies correction processing to the surface shape of the replacement target optical element selected by the selector based on the surface shape and change quantity of the replacement target optical element calculated by the arithmetic operation device,
wherein the optical system is assembled and adjusted by using the replacement target optical element to which the correction processing is applied.

29. The optical system radial deformation adjustment system according to claim 28, wherein the selector classifies the replacement target optical elements into classes and manages them while uniforming respective probability densities based on a distribution of each generation frequency with respect to a height and a range of the radial deformation, and selects the replacement target optical element from the classes.

30. The optical system radial deformation adjustment system according to claim 22, wherein the correction processing machine polishes a specified quantity at a specified position on the correction processing target surface of the optical element.

31. The optical system radial deformation adjustment system according to claim 26, wherein the correction processing machine polishes a specified quantity at a specified position on the correction processing target surface of the optical element.

32. The optical system radial deformation adjustment system according to claim 28, wherein the correction processing machine polishes a specified quantity at a specified position on the correction processing target surface of the optical element.

33. The optical system radial deformation adjustment method according to claim 2, wherein the simulation uses real ray tracing.

34. The optical system radial deformation adjustment method according to claim 1, wherein the correction processing with respect to the optical element polishes a specified quantity at a specified position on the correction processing target surface of the optical element by using the correction processing machine.

35. The optical system radial deformation adjustment method according to claim 8, the correction processing with respect to the optical element polishes a specified quantity at a specified position on the correction processing target surface of the optical element by using the correction processing machine.

36. The optical system radial deformation adjustment method according to claim 11, wherein the correction processing with respect to the optical element polishes a specified quantity at a specified position on the correction processing target surface of the optical element by using the correction processing machine.

37. The optical system radial deformation adjustment method according to claim 17, wherein the correction processing with respect to the optical element polishes a specified quantity at a specified position on the correction processing target surface of the optical element by using the correction processing machine.

38. The optical system radial deformation adjustment method according to claim 1, wherein the assembling and adjustment of the optical system including the optical element are carried out by using one of a method for adjusting an air gap between the respective optical elements by changing a thickness of a washer between body tubes holding the optical elements after arranging all the optical elements at predetermined positions, a method for shifting the optical element in a vertical direction with respect to the optical axis, a method for tilting the optical element with a direction vertical to the optical axis being determined as an axis, and a method for rotating the optical element around the optical axis.

39. The optical system radial deformation adjustment method according to claim 8, wherein the assembling and adjustment of the optical system including the optical element are carried out by using one of a method for adjusting an air gap between the respective optical elements by changing a thickness of a washer between body tubes holding the optical elements after arranging all the optical elements at predetermined positions, a method for shifting the optical element in a vertical direction with respect to the optical axis, a method for tilting the optical element with a direction vertical to the optical axis being determined as an axis, and a method for rotating the optical element around the optical axis.

40. The optical system radial deformation adjustment method according to claim 16, wherein the assembling and adjustment of the optical system including the optical element are carried out by using one of a method for adjusting an air gap between the respective optical elements by changing a thickness of a washer between body tubes holding the optical elements after arranging all the optical elements at predetermined positions, a method for shifting the optical element in a vertical direction with respect to the optical axis, a method for tilting the optical element with a direction vertical to the optical axis being determined as an axis, and a method for rotating the optical element around the optical axis.

41. The optical system radial deformation adjustment method according to claim 11, wherein the assembling and adjustment of the optical system including the optical element are carried out by using one of a method for adjusting an air gap between the respective optical elements by changing a thickness of a washer between body tubes holding the optical elements after arranging all the optical elements at predetermined positions, a method for shifting the optical element in a vertical direction with respect to the optical axis, a method for tilting the optical element with a direction vertical to the optical axis being determined as an axis, and a method for rotating the optical element around the optical axis.

42. The optical system radial deformation adjustment method according to claim 17, wherein the assembling and adjustment of the optical system including the optical element are carried out by using one of a method for adjusting an air gap between the respective optical elements by changing a thickness of a washer between body tubes holding the optical elements after arranging all the optical elements at predetermined positions, a method for shifting the optical element in a vertical direction with respect to the optical axis, a method for tilting the optical element with a direction vertical to the optical axis being determined as an axis, and a method for rotating the optical element around the optical axis.

* * * * *